United States Patent [19]
Satyapal et al.

[11] Patent Number: 5,997,825
[45] Date of Patent: Dec. 7, 1999

[54] REFRIGERANT DISPOSAL

[75] Inventors: Sunita Satyapal, East Hampton; Tobias H. Sienel, Manchester; H. Harvey Michels, West Hartford; James D. Freihaut, South Windsor, all of Conn.

[73] Assignee: Carrier Corporation, Syracuse, N.Y.

[21] Appl. No.: 08/733,187

[22] Filed: Oct. 17, 1996

[51] Int. Cl.⁶ .................................................. B01D 50/00
[52] U.S. Cl. ........................................ 422/177; 422/186
[58] Field of Search ................................... 422/177, 186

[56] References Cited

U.S. PATENT DOCUMENTS

| | | | |
|---|---|---|---|
| 4,441,330 | 4/1984 | Lower et al. | 62/149 |
| 4,476,688 | 10/1984 | Goddard | 62/149 |
| 4,766,733 | 8/1988 | Scuderi | 62/77 |
| 4,809,520 | 3/1989 | Manz et al. | 62/292 |
| 4,862,699 | 9/1989 | Lounis | 62/84 |
| 4,903,499 | 2/1990 | Merritt | 62/149 |
| 4,931,167 | 6/1990 | Wilwerding. | |
| 4,942,741 | 7/1990 | Hancock et al. | 62/292 |
| 5,028,452 | 7/1991 | Beatty. | |
| 5,127,232 | 7/1992 | Paige et al. | 62/77 |
| 5,146,760 | 9/1992 | Paige | 62/149 |
| 5,146,761 | 9/1992 | Cavanaugh et al. | 62/149 |
| 5,174,124 | 12/1992 | Paige et al. | 62/125 |
| 5,181,390 | 1/1993 | Cavanaugh et al. | 62/126 |
| 5,243,828 | 9/1993 | Paige et al. | 62/125 |
| 5,247,804 | 9/1993 | Paige et al. | 62/77 |
| 5,255,527 | 10/1993 | Paige | 62/85 |
| 5,414,200 | 5/1995 | Mouk et al. . | |
| 5,545,390 | 8/1996 | Drakesmith et al. . | |
| 5,582,019 | 12/1996 | Hanna et al. | 62/85 |
| 5,602,295 | 2/1997 | Abel et al. . | |

FOREIGN PATENT DOCUMENTS

| | | |
|---|---|---|
| 0 135 043 | 3/1985 | European Pat. Off. . |
| 0 474 500 | 3/1992 | European Pat. Off. . |
| 0 679 434 | 11/1995 | European Pat. Off. . |
| WO93 05845 | 4/1993 | WIPO . |

*Primary Examiner*—Edward J. Cain
*Attorney, Agent, or Firm*—William W. Habelt

[57] ABSTRACT

A system for the in situ destruction of compressible refrigerant from a refrigerant containing apparatus includes a refrigerant recovery apparatus (30) for receiving refrigerant from the refrigerant containing apparatus (20) and a refrigerant disposal apparatus (100) for destroying refrigerant received from the recovery apparatus. The disposal apparatus (100) includes a storage tank (110) for collecting refrigerant received from the recovery apparatus (30) and a reactor device (130) for receiving refrigerant collected in said storage tank and destroying the refrigerant received from the storage tank. The reactor device includes a reaction chamber (135) housing a replaceable reactor core (140) containing a reagent functional to chemically react with the received refrigerant. A heater device (138) is provided in operative association with the reaction chamber for heating the reactor core (140) to a desired temperature at which the reagent will most effectively react with the refrigerant.

20 Claims, 7 Drawing Sheets

REFRIGERANT DISPOSAL

BACKGROUND OF THE INVENTION

The present invention relates generally to refrigerant recovery systems and, more specifically, to a refrigerant disposal system useful in connection with a refrigerant recovery system for the on-site destruction of recovered refrigerants. The refrigerant disposal system is suitable for use with conventional refrigerant recovery systems whether the refrigerant is recovered as a vapor or a liquid.

A wide variety of mechanical refrigeration systems are currently in use in a wide variety of applications, such as, for example, domestic refrigeration, commercial refrigeration, air conditioning, dehumidifying, food freezing, cooling and manufacturing processes, and numerous other applications. The vast majority of mechanical refrigeration systems operate according to similar, well known principals, employing a closed-loop fluid circuit through which a refrigerant flows. Those familiar with mechanical refrigeration systems will recognize that such systems periodically require service. Such service may include removal of, and replacement or repair of, a component of the system. Further during normal system operation the refrigerant can become contaminated by foreign matter within the refrigeration circuit, or by excess moisture in the system. The presence of excess moisture can cause ice formation in the expansion valves and capillary tubes, corrosion of metal, copper plating and chemical damage to insulation in hermetic compressors. Acid can be present due to motor burn out which is caused by overheating of the refrigerant. Such burn outs can be temporary or localized in nature as in the case of a friction producing chip which produces a local hot spot which overheats the refrigerant. The main acids of concern are HCl and HF, but other acids and contaminants can be produced as the decomposition products of oil, insulation, varnish, gaskets and adhesives. Such contamination may lead to component failure or it may be desirable to change the refrigerant to improve the operating efficiency of the system.

When servicing a refrigeration system it is necessary to vent the refrigerant from the system before the components of the system are serviced and repaired. However, older refrigeration systems typically use chlorofluorocarbon compounds (CFCs), such as R-11 and R-12, which are believed to have an adverse impact on stratospheric ozone. More recently, refrigeration systems are being marketed that use hydrochlorofluorocarbons (HCFCs), such as R-22 and R-123, and hydrofluorocarbons (HFCs) which, although considered to have little or no impact on stratospheric ozone, are believed to contribute to possible global warming, owing to their relatively long atmospheric lifetimes. Thus, it is no longer considered environmentally acceptable to vent any type of refrigerant to the atmosphere from refrigeration systems containing such conventional refrigerants.

Accordingly, systems have been provided that are designed to recover the refrigerant from refrigeration systems. Representative examples of conventional refrigerant recovery systems are shown in the following U.S. Pat. Nos. 4,441,330 to Lower et al for "Refrigerant Recovery And Recharging System"; 4,476,688 to Goddard for "Refrigerant Recovery And Purification System"; 4,766,733 to Scuderi for "Refrigerant Reclamation And Charging Unit"; 4,809,520 to Manz et al for "Refrigerant Recovery And Purification System"; 4,862,699 to Lounis for "Method And Apparatus For Recovering, Purifying and Separating Refrigerant From Its Lubricant"; 4,903,499 to Merritt for "Refrigerant Recovery System"; 4,942,741 to Hancock et al for "Refrigerant Recovery Device"; 5,127,232 to Paige et al for "Method And Apparatus For Recovering And Purifying Refrigerant"; 5,146,760 to Paige for "Method And Apparatus For Compressor Protection In A Refrigerant Recovery System"; 5,146,761 to Cavanaugh et al for "Method And Apparatus For Recovering Refrigerant"; 5,174,124 to Paige et al for "Apparatus For Sampling The Purity Of Refrigerant Flowing Through A Refrigeration Circuit"; 5,181,390 to Cavanaugh et al for "Manually Operated Refrigerant Recovery Apparatus"; 5,243,828 to Paige et al for "Control System For Compressor Protection In A Manually Operated Refrigerant Recovery Apparatus"; 5,247,804 to Paige et al for "Method And Apparatus For Recovering And Purifying Refrigerant Including Liquid Recovery"; and 5,255,527 to Paige for "Method Of Testing The Purity Of Refrigerant Flowing Through A Refrigeration System".

In conventional refrigerant recovery systems such as for example the systems disclosed in the aforementioned patents, the refrigerant vented from the refrigeration system is condensed and collected in a storage tank. If the particular refrigerant collected is of the class of refrigerants now considered environmentally unacceptable, the refrigerant storage tank is sealed, removed from the recovery system and sent to a processing center for destruction. At the processing center, the refrigerant is treated, for example by incineration, high temperature oxidative reactions, catalyzed chemical reduction, reaction/reduction with solvated electrons, or biodegradation in either anaerobic or aerobic environments, to decompose the refrigerant into environmentally benign products. While suitable for large batch treatment of refrigerants at large processing centers, such treatment strategies are not optimum for use for small batch processing of recovered refrigerants on-site at the location of the refrigeration system from which the refrigerant was recovered. On-site disposal of recovered refrigerant would avoid the transportation and handling costs associated with removal of the recovered refrigerant to an off-site processing center. On-site disposal of recovered refrigerant in an environmentally acceptable manner would also be particularly advantageous for use in connection with mobile air conditioning units, transportation refrigeration units, residential air conditioners and smaller commercial air conditioning or refrigeration installations.

SUMMARY OF THE INVENTION

It is an object of the present invention to provide a system for the in situ disposal of recovered refrigerant at the recovery site.

It is an object of one aspect of the present invention to provide an in situ refrigerant disposal which is readily reusable without shipment to a processing facility for regeneration.

A system for the in situ destruction of compressible refrigerant from a refrigerant containing system comprises a refrigerant recovery apparatus for receiving refrigerant from the refrigerant containing apparatus, either as liquid refrigerant or as gaseous refrigerant, and a refrigerant disposal apparatus for destroying refrigerant received from the recovery apparatus. The disposal apparatus includes a storage tank for collecting refrigerant received from the recovery apparatus and a reactor device for receiving refrigerant collected in said storage tank and destroying the refrigerant received from the storage tank. The recovery apparatus has a first flow path passing liquid refrigerant received from the refrigerant containing apparatus through a first outlet port directly to the storage tank. The recovery apparatus also has a second flow path for passing gaseous refrigerant received from the refrigerant containing apparatus through a second outlet to the storage tank A compressor device and a condenser device are disposed in the second flow path upstream of the second outlet. The compressor device compresses gaseous refrigerant delivered thereto and the condenser device cools and at least partially condenses the compressed refrigerant before the cooled and at least partially condensed refrigerant passes through the second outlet to the storage tank. A heat exchanger may be disposed in operative association with the reactor for heating the refrigerant passing from the storage tank to the reactor, and also cooling reactant products passing from the reactor.

The reactor device may comprise a housing having an access door and defining a reaction chamber therewithin wherein a replaceable reactor core is disposed. The reactor core contains a reagent functional to chemically react with the received refrigerant. A heater device is provided in operative association with the reaction chamber for heating the reaction chamber and the reactor core to a desired temperature at which the reagent will most effectively react with the refrigerant. For a halogenated hydrocarbon refrigerant, the reagent contained in the reactor core may comprise a reagent effective in reducing halogenated hydrocarbons to halides, such as for example sodium oxalate, sodium carbonate, sodium iodide, ammonia and amines. Alternatively, the reagent contained in the reactor core might also comprise a reagent effective in oxidizing halogenated hydrocarbons to carbon dioxide, water and acids that can be readily neutralized.

BRIEF DESCRIPTION OF THE DRAWINGS

The present invention will be best understood from the following description of the preferred embodiments when read in connection with the accompanying drawings wherein.

DESCRIPTION OF THE PREFERRED EMBODIMENT

Figure 1:
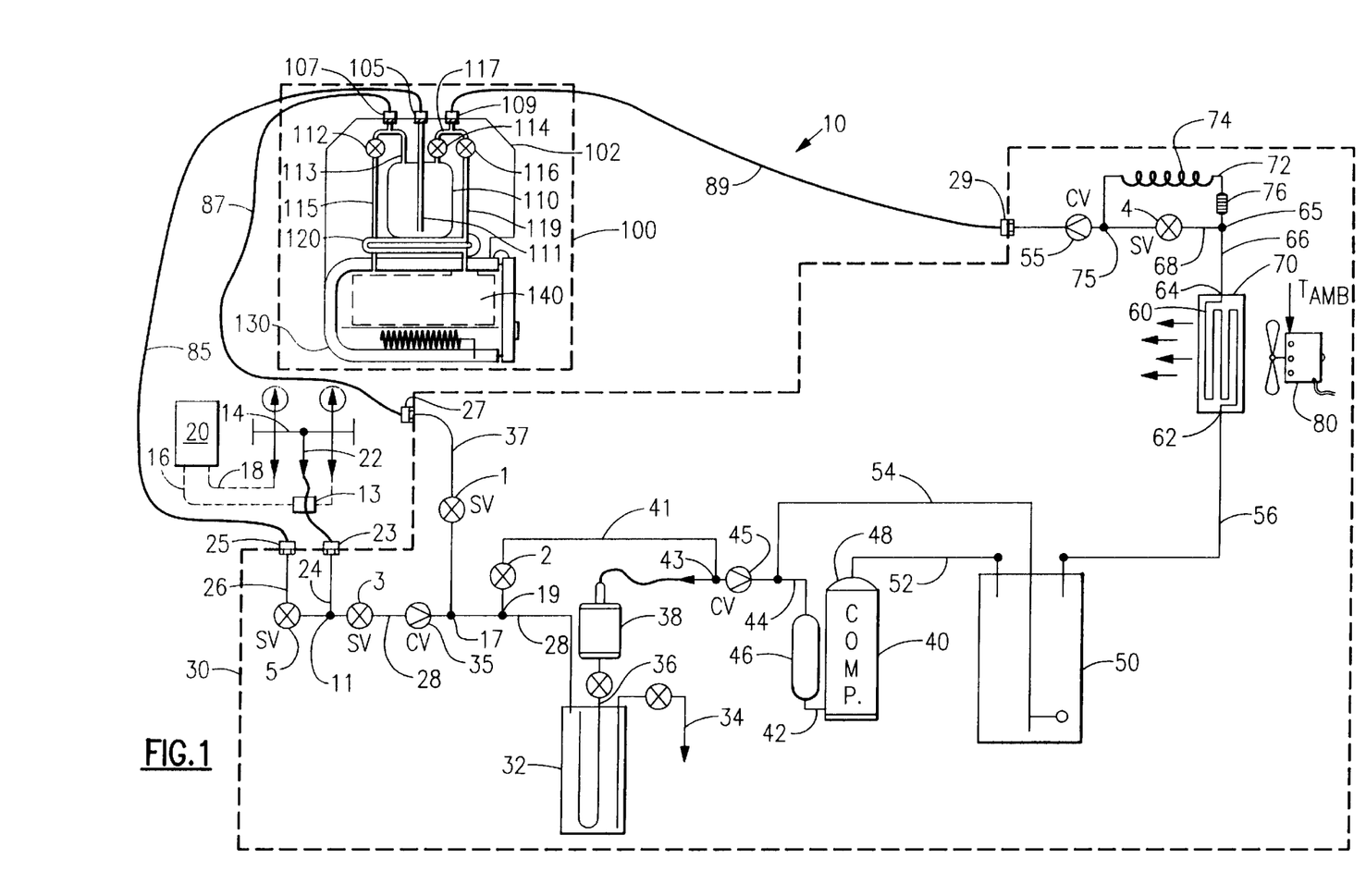
FIG. 1 is a diagrammatical representation of a refrigerant recovery system embodying a refrigerant disposal apparatus in accordance with the present invention.

Referring now to FIG. 1, there is depicted a refrigerant recovery system 10 suitable for use in processing refrigerant evacuated from a refrigerant containing apparatus 20 to be serviced. The refrigerant containing apparatus 20 may be virtually any mechanical refrigeration apparatus, including for example residential air conditioners, commercial air conditioning systems, refrigerators, freezers, refrigerated cargo containers and other stationary or mobile air conditioning and refrigeration equipment utilizing a refrigerant as a heat transfer fluid.

The refrigeration recovery system 10 includes two sections, as shown in FIG. 1, the refrigerant recovery apparatus 30, which includes the components and associated controls of the system 10 operational to recover the refrigerant being vented, and the refrigerant disposal apparatus 100, which comprises the components and associated controls of the system 10 operational to collect and destroy the recovered refrigerant. The refrigerant recovery apparatus 30 and the refrigerant disposal apparatus 100 may be contained within their respective self-contained compact housings (schematically represented by the dotted lines 30 and 100, respectively, in FIG. 1), or the recovery apparatus 30 and the disposal apparatus 100 may be packaged in a single housing. The details of each of these sections and their interconnection and interaction with one another will be described in detail hereinafter. Although the refrigerant recovery apparatus 30 will be described hereinafter with respect to a particular embodiment of a conventional type of refrigerant recovery apparatus utilized by Carrier Corporation and depicted in FIG. 1, it is to be understood that the refrigerant disposal apparatus 100 may be utilized with any of the various types of refrigerant recovery apparatus commercially available and that the particular embodiment of the refrigerant recovery apparatus utilized is not germane to the invention.

As in conventional practice, a standard gauge and service manifold 14 provides the interface between the refrigerant containing apparatus 20 being serviced and the recovery apparatus 30 of the refrigerant recovery system 10. The manifold 14 is connected to the refrigeration containing apparatus 20 to be serviced in a standard manner with one line 16 connected to the low pressure side of the apparatus 20 and another line 18 connected to the high pressure side of the apparatus 20. A flexible high pressure refrigerant line 13 is interconnected between the service connection 22 of the service manifold 14 and a first coupling 23 mounted on the housing of the recovery apparatus 30 and in flow communication with refrigerant line 24 which extends from the coupling 23 to a branch connection 11 in refrigerant line 28 within the recovery apparatus 30.

From the branch connection 11, there are two refrigerant paths through the refrigerant line 28. One path, i.e. the liquid path, extends to the left when viewing FIG. 1 from branch connection 11 to an electrically actuatable solenoid valve 5. A refrigerant line 26 extends from solenoid valve 5 to a second coupling 25 mounted on the housing of the recovery apparatus 30 and adapted to receive an external refrigerant line so as to establish flow communication between the refrigerant line 26 and the external refrigerant line connected thereto. The other path, i.e. the vapor path, extends to the right when viewing FIG. 1 from branch connection 11 to an electrically actuatable solenoid valve 3. Solenoid valves 3 and 5, as well as other solenoid valves in the recovery system, are selectively actuatable to allow refrigerant to pass therethrough when actuated to the open position or to prevent the flow of refrigerant therethrough when actuated to the closed position.

From solenoid valve 3, the refrigerant line 28 extends through a check valve 35 to the inlet of a combination accumulator/oil trap 32, having an oil drain spigot 34. Check valve 35 prevents back flow of refrigerant from the recovery system 10 to the apparatus 20 being serviced. Refrigerant gas is drawn from the accumulator/oil trap 32 through refrigerant line 36 to an acid purification filter-dryer 38 wherein impurities such as acid, moisture, foreign particles and the like are removed before the gases are passed via refrigerant line 44 to the suction port 42 of the compressor 40. A suction line accumulator 46 may be disposed in the line 44 to ensure that no liquid refrigerant passes to the suction port 42 of the compressor. A check valve 45 that allows flow only in the direction from the filter-dryer 38 to the compressor is also disposed in the line 44. Although preferably a commercial available rotary compressor, the compressor 40 may be of any compressor type, such as reciprocating, scroll or screw.

At branch connection 17, located in line 28 at a point downstream of the check valve 35 and upstream of the accumulator/oil trap 32, a refrigerant line 37 extends through a solenoid valve 1 to a coupling 27 mounted in the housing of the recovery apparatus 30 and adapted to connect to an external refrigerant line. The line 37 provides flow communication from the coupling 27 to the line 28 through the selectively operable solenoid valve 1. At branch connection 19, located in line 28 at a point downstream of the branch connection 17 and upstream of the accumulator/oil trap 32, a bypass line 41 extends from branch connection 19 through a solenoid valve 2 to the branch connection 43 located in line 44 at a point downstream of the filter/dryer 38. The line 41 provides a refrigerant flow path bypassing the accumulator/oil trap 32 and the filter/dryer 38. The normally closed solenoid valve 2 is selectively operable to open to allow refrigerant flow through the bypass line 41.

The compressor discharge port 48 is connected via refrigerant line 52 in flow communication with an oil separator 50, which may be a conventional float operated oil separator, wherein oil from the recovery compressor 40 is separated from gaseous refrigerant and directed via float controlled return line 54 to line 44 upstream of the suction port 42 of the compressor 40. The line 54 is sized to allow sufficient oil return but is also restrictive enough to limit the by-pass of high pressure refrigerant vapor back to the compressor suction. The outlet of the oil separator 50 is interconnected via line 56 to the inlet 62 of the condenser coil 60 of a heat exchanger 70. An electrically actuated condenser fan 80 is associated with the heat exchanger 70 to direct the flow of ambient air across the condenser coil 60.

From the outlet 64 of the condenser coil 60 an appropriate conduit 66 conducts refrigerant to a branch connection 65. From the branch connection 65, one branch line 68 passes through another electrically actuated solenoid valve 4 and thence a check valve 55 and connects to a coupling 29, mounted in the housing of the recovery apparatus 30, that provides a means for connecting the line 68 with an external refrigerant line. The other branch line 72 from the branch connection 65 passes to a suitable refrigerant expansion device 74. In the illustrated embodiment, the expansion device 74 is a capillary tube and a strainer 76 is disposed in the line 72 upstream from the capillary tube to remove any particles which might potentially block the capillary tube. It should be appreciated that the expansion device 74, may comprise any of the other numerous well known refrigerant expansion devices which are widely commercially available. The line 72, in which the expansion device 74 is disposed rejoins the conduit 68, in which the solenoid valve 4 is disposed, at a second branch connection 75 downstream from both devices and upstream of the check valve 55. The check valve 55 allows flow through the line 68 and from the branch connection 75 toward the coupling 29 and prevents backflow into the line 68 from any external line that may be connected during operation to the coupling 29. It should be appreciated that the solenoid valve 4 and the expansion device 74 are in a parallel fluid flow relationship. As a result, when the solenoid valve 4 is open, the flow of refrigerant will be, because of the high resistance of the expansion device 74, through line 68 and the solenoid valve 4 in a substantially unrestricted manner. On the other hand, when the valve 4 is closed, the flow of refrigerant will be through the line 72 and the expansion device 74.

The recovery apparatus 30 is connected via external refrigerant lines to a storage tank 110, which in the depicted embodiment is part of the refrigerant disposal system 100. External refrigerant line 85 is connected between coupling 25 on the recovery apparatus 30 and a first port 105 on the storage tank 110 of the refrigerant disposal apparatus 100. External refrigerant line 87 is connected between coupling 27 on the recovery apparatus 30 and a second port 107 on the storage tank 110 of the refrigerant disposal apparatus 100. External refrigerant line 89 is connected between coupling 29 on the recovery apparatus 30 and a third port 109 on the storage tank 110 of the refrigerant disposal apparatus 100.

When employed to vent refrigerant from a refrigerant containing apparatus 20, the refrigerant recovery apparatus 30 may be operated in either a vapor refrigerant recovery mode, or a liquid refrigerant recovery mode. In operation the selective positioning of each of the solenoid valves 1 through 5 in either its respective open or closed position determines the refrigerant flow path through the recovery apparatus for recovery of the refrigerant as either a liquid or a vapor. The opening of the solenoid valves may be controlled manually by an operator or automatically by a controller (not shown), for example a microprocessor, when the operator selects the desired mode of recovery. A detailed discussion of the manual control of a recovery apparatus similar to the recovery apparatus 30 is presented in commonly assigned U.S. Pat. Nos. 5,181,390 to Cavanaugh et al for "Manually Operated Refrigerant Recovery Apparatus" and 5,243,828 to Paige et al for "Control System For Compressor Protection In A Manually Operated Refrigerant Recovery Apparatus". A detailed discussion of the automatic control via a microprocessor of a recovery apparatus similar to the recovery apparatus 30 is presented in commonly assigned U.S. Pat. No. 5,247,804 to Paige et al for "Method And Apparatus For Recovering And Purifying Refrigerant Including Liquid Recovery".

In conventional prior art refrigerant recovery systems wherein a collection/storage tank is provided for receiving liquid and vapor refrigerant vented from a refrigerant containing apparatus. This collection tank serves the purpose of providing a storage volume in which the vented refrigerant is collected and stored for disposal in a separate system or, more commonly, for shipment to an off site processing facility. In the system of the present invention, however, a refrigerant disposal apparatus 100 replaces the conventional collection tank associated with prior art systems. In accordance with the refrigerant disposal apparatus 100 includes not only the storage tank 110 together with its associated valves for controlling the flow of refrigerant fluid through the ports 105, 107 and 107; but also a reactor 130 wherein refrigerant is chemically converted to soluble halide products which can be disposed of without environmental concern and non-halogenated gases, such as $CO_2$ and $H_2O$.

Figure 2:
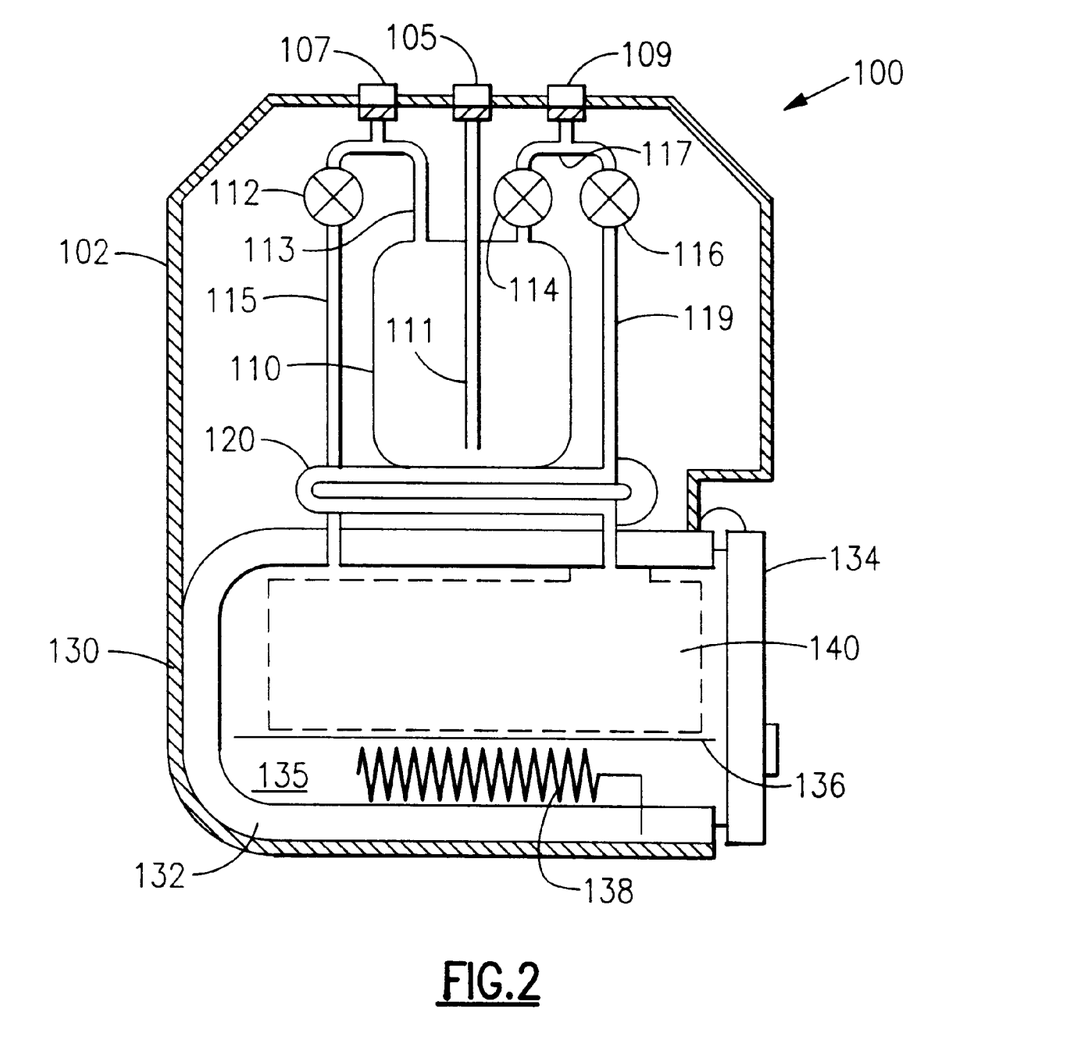
FIG. 2 is an enlarged diagrammatical representation of the refrigerant disposal apparatus of the refrigerant recovery system of FIG. 1.

Referring now to FIG. 2 in particular, the storage tank 100 and a refrigerant destruction reactor 130 are disposed within the housing 102. In the preferred embodiment as depicted, the storage tank 100 is disposed superadjacent a heat exchanger 120 which in turn is disposed superadjacent the reactor 130. The reactor 130 comprises an insulated housing 132 having an insulated access door 134 and defining an oven chamber 135 therein. A replaceable reactor core 140 is disposed within the oven chamber 135 atop a support member 136. A heater 138 is disposed within the chamber 135 beneath the support member 136 and is selectively operative to heat the reactor core to a desired temperature. The heater 138 may comprise an electrical resistance heating element, as depicted in FIGS. 1–6 of the drawing, or a flame burner, such as a propane burner, or other type of heating means. In an alternate embodiment of the disposal apparatus 100, shown in FIG. 7 and discussed in further later, the heater comprises a microwave device.

Each of the first port 105, the second port 107 and the third port 109, provided in the housing 102, is equipped with an associated coupling for connecting to a respective external refrigerant line which is connected to a respective coupling on the reactant recovery apparatus 30 as hereinbefore discussed. The first port 105 is connected via the conduit 111 in flow communication with the interior of the storage tank 110. The second port 107 is connected via the conduit 113 in flow communication with the interior of the storage tank 110 and via the conduit 115 in flow communication with the reactor 130. The third port 109 is connected via the conduit 117 in flow communication with the interior of the storage tank 110 and via the conduit 119 in flow communication with the reactor 130. Selectively actuatable solenoid valves 112, 114 and 116 are provided in the conduits 115, 117, and 119, respectively. In the closed position, each of the valves 112, 114, 116 prevent flow through their respective conduits 115, 117, 119, and in the open position permit flow through their respective conduits.

In the preferred embodiment as depicted in drawing, the conduits 115 and 119 pass through the heat exchanger 120 disposed intermediate the storage tank 110 and the reactor 130. When the refrigerant disposal apparatus 100 is operating in the refrigerant destruction mode, as will be discussed in further detail hereafter, as refrigerant passes from the liquid storage tank 110 via conduits 115 and 119 to the reactor 130, it is heated as it passes through the heat exchanger 120. As gases from the reactor 130 pass back the conduits 115 and 119, the gases pass through the heat exchanger 120. In this manner, heat in the gases generated from destruction of the refrigerant in the reactor 130 is recovered in the heat exchanger 130 and used to preheat the refrigerant passing to the reactor 130 for destruction.

During operation of the refrigerant disposal apparatus 100 in the refrigerant destruction mode, refrigerant is passed from the storage tank 110 into the reactor chamber 135 of the reactor 130 for destruction. Depending upon the type of reagent in the bed, the halogenated hydrocarbons in the refrigerant are converted in the reactor core 140 into environmentally acceptable reaction products, such as halides and carbon, which remain within the reactor core 140, as well as gaseous reaction products, such as carbon dioxide, water and acids, for example HCl and HF, which may be readily neutralized in the system. When the reactor core 140 is spent, the access door 134 is opened and the spent reactor core is removed and replaced with a fresh reactor core and the destruction process repeated. The heater 138 is activated, advantageously prior to the initiation of the admission of refrigerant to be destroyed into the reaction chamber 135, to preheat and maintain the reaction chamber 135 and reactor core 140 at a desired temperature, that is selected for the particular chemical reactions that will occur within the reactor core 140 during the refrigerant destruction process.

Advantageously, the reactor core 140 comprises a bed of chemical reactant suitable for converting the halogenated refrigerant compounds to halides. Examples of reagents that are suitable for use in the reactor core 140 and are effective in reducing halogenated hydrocarbon compounds to soluble halides include reducing agents such as sodium oxalate, sodium carbonate, electrophiles such as sodium iodide, and Lewis bases such as ammonia and amines. In general, any electron donor molecule that can result in halogen abstraction from the parent refrigerant molecule could conceivably be used as the reactant in the reactor core 140. Alkali salts of such electron donor species are particularly attractive as the reactant in the reactor core 140 since the reaction products retained in the spent reactor core would consist mainly of water soluble, environmentally compatible and readily disposable halides such as NaCl and NaF. An example of a reducing reagent for the reactor core is a bed of sodium oxalate heated to between about 300° C. and about 500° C. The halogenated hydrocarbon destroying reactions that may be utilized in the reactor core are not limited to reductive reactions producing halides and carbon. The hydrogenated hydrocarbons may also be destroyed by oxidative reactions, that for example may use oxygen and a catalyst dispersed in the bed, such as activated carbon, which will produce reaction products such as carbon dioxide, water, and acids, for example HCl and HF, which may be readily neutralized in the system.

In operation, the refrigerant disposal apparatus 100 may be connected to any conventional refrigerant recovery apparatus to which a conventional refrigerant collection/storage tank could be connected and may be connected thereto in the same way. As noted previously, in the refrigerant recovery system depicted in FIG. 1, the refrigerant disposal apparatus 100 is connected to the refrigerant recovery apparatus via three external refrigerant lines which serve to provide flow communication back and forth between the refrigerant disposed apparatus 100 and the refrigerant recovery system 30. External refrigerant line 85 is connected between coupling 25 on the recovery apparatus 30 and the first port 105 on the storage tank 110 of the refrigerant disposal apparatus 100. External refrigerant line 87 is connected between coupling 27 on the recovery apparatus 30 and the second port 107 on the storage tank 110 of the refrigerant disposal apparatus 100. External refrigerant line 89 is connected between coupling 29 on the recovery apparatus 30 and the third port 109 on the storage tank 110 of the refrigerant disposal apparatus 100.

Figure 3:
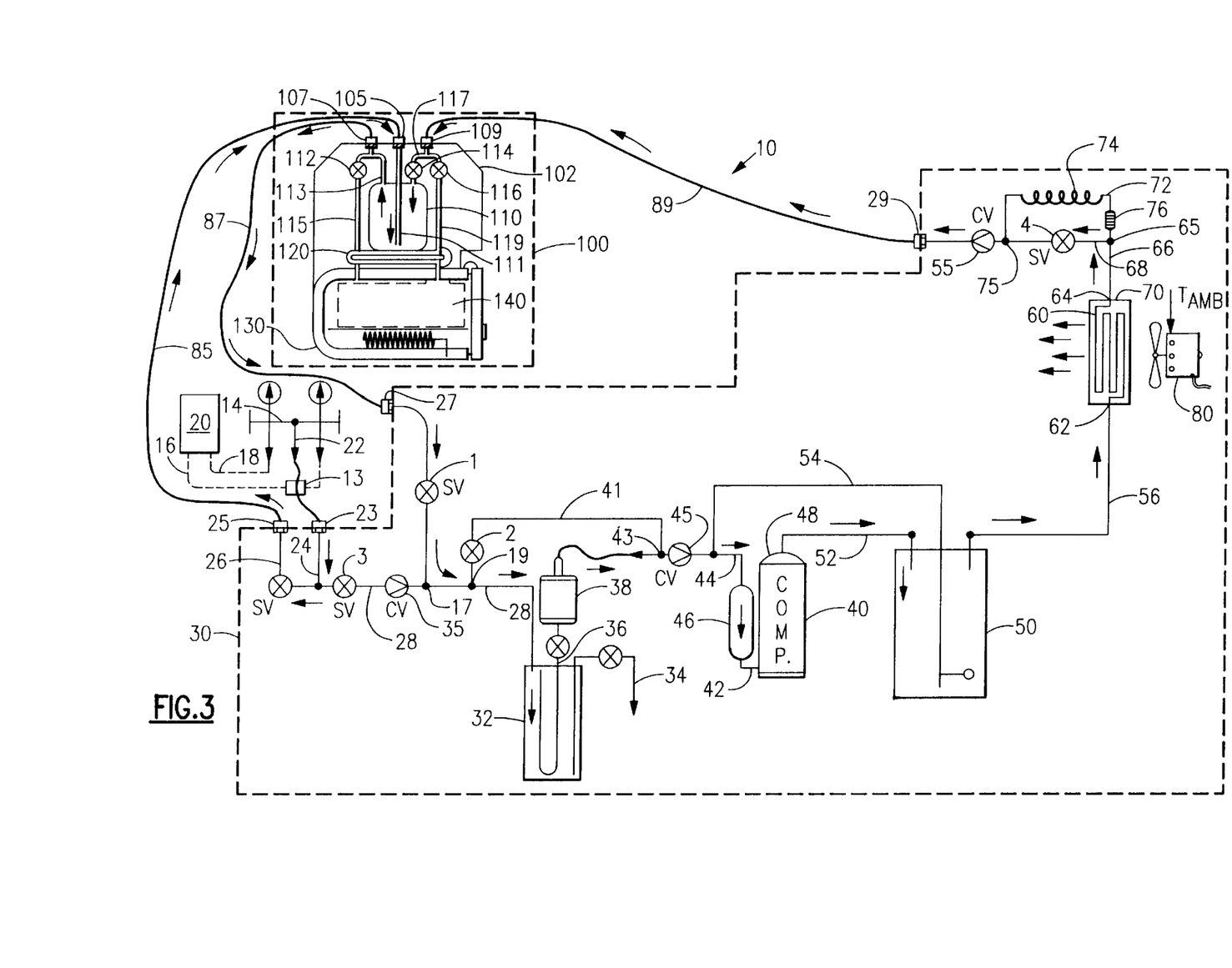
FIG. 3 is a diagrammatical representation of a refrigerant recovery system of FIG. 1 operating in the liquid refrigerant recovery mode.

The operation of the refrigerant recovery system 10 will now be discussed in each of four different modes: a liquid recovery mode; a vapor recovery mode; a storage tank cooling mode; and a refrigerant destruction mode. Referring now to FIG. 3 in particular, in the liquid recovery mode, liquid refrigerant enters the refrigerant recovery apparatus 30 from the refrigerant containing equipment 20 via the service gage manifold 14 through lines 22, 13 and 24. On the refrigerant recovery apparatus 30, the selectively positionable valves 2 and 3 are positioned closed and the selectively positionable valves 1 and 5 are positioned open. On the refrigerant disposal apparatus 100, the selectively positionable valve 114 is positioned open and the selectively positionable valves 112 and 1 16 are positioned closed. With the valve 3 closed and the valve 5 open, the incoming refrigerant passes through the lines 28, 26 and 85 directly to the first port 105 on the disposal apparatus 100 and thence through conduit 111 into the storage tank 110.

At the same time, vaporous refrigerant is being withdrawn from the top of the storage tank 110 via the second port 107 through line 87 and into the recovery apparatus 30 through line 37 and open valve 1. Therein, the refrigerant vapor passes through line 28 to and through the accumulator/oil trap 32, through the filter dryer 38, through line 44 and the accumulator 46, to suction port 42 and into the compressor 40. Compressed refrigerant exiting from the compressor 40 passes through line 52, the oil separator 50 line 56 to and through the air cooled condenser 70. If the valve 4 is open, compressed and condensed liquid refrigerant passing from the condenser 70 then passes through lines 66 and 68, the open valve 4 and external line 89 to the third port 109 on the storage tank 110. If the valve 4 is closed, the compressed and condensed liquid refrigerant passing from the condenser 70 then passes through lines 66 and 72, through the expansion coil 74, wherein the compressed liquid is expanded to a lower pressure and further cooled by the expansion. From the expansion coil 74, the refrigerant which now may be a mixture of liquid and vapor, passes through the portion of line 68 downstream of the branch connection 75 to and through the external line 89 to the third port 109 on the storage tank 110. As the valve 114 is open and the valve 116 is closed, the liquid refrigerant entering through the third port 109 passes through line 117 directly into the storage tank 110.

Figure 4:
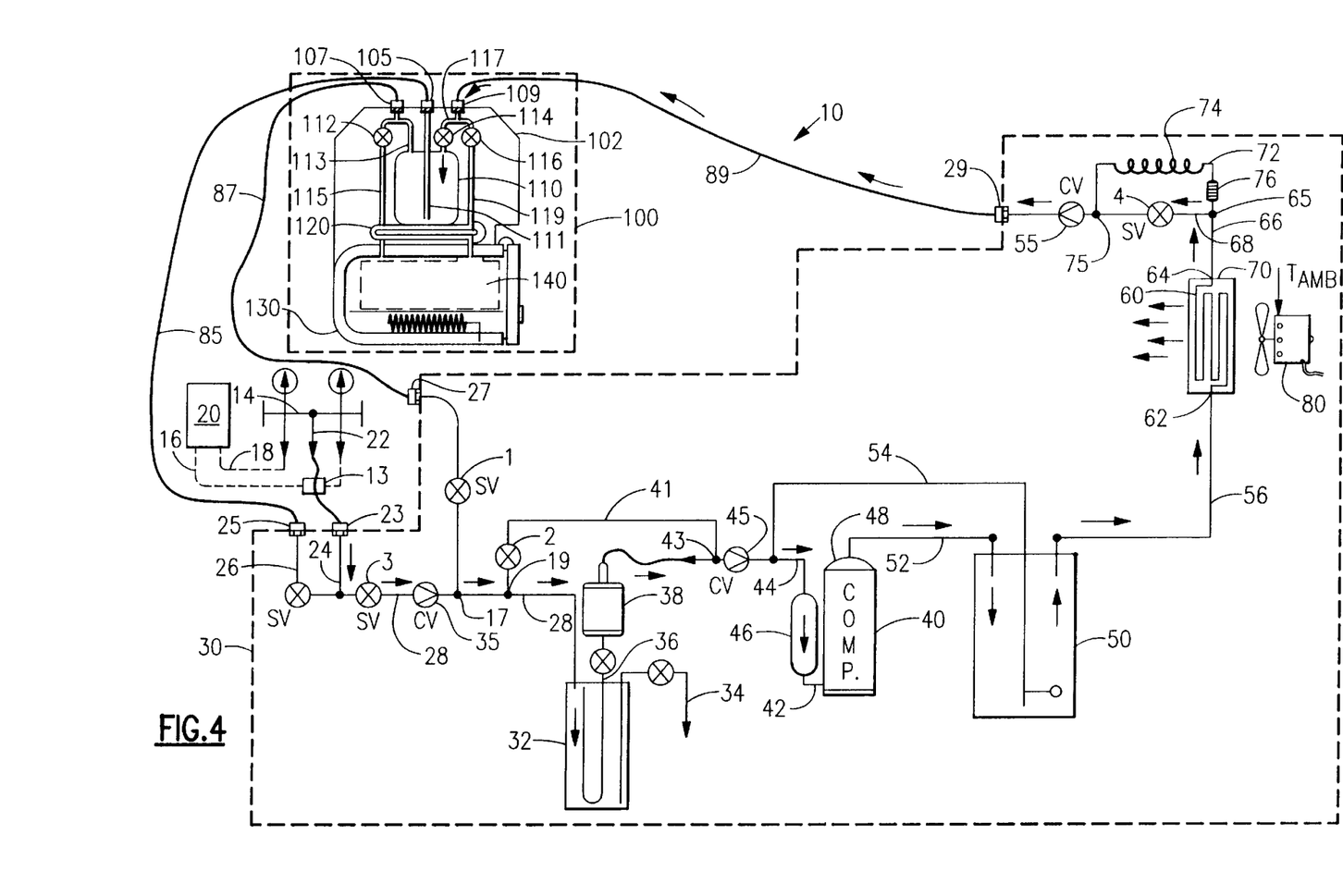
FIG. 4 is a diagrammatical representation of a refrigerant recovery system of FIG. 1 operating in the gaseous refrigerant recovery mode.

Referring now to FIG. 4, in the vapor recovery mode, vaporous refrigerant enters the refrigerant recovery apparatus 30 from the refrigerant containing equipment 20 via the service gage manifold 14 through lines 22, 12 and 24. On the refrigerant recovery apparatus 30, the selectively positionable valves 1, 2 and 5 are positioned closed and the selectively positionable valve 3 is positioned open. On the refrigerant disposal apparatus 100, the selectively positionable valve 114 is positioned open and the selectively positionable valves 112 and 116 are positioned closed, as in the liquid recovery mode. With the valve 5 closed and the valve 3 open, the incoming refrigerant passes through the line 28 to and through the accumulator/oil trap 32, through the filter dryer 38, through line 44 and the accumulator 46, to suction port 42 and into the compressor 40. Compressed refrigerant exiting from the compressor 40 passes through line 52, the oil separator 50. line 56 to and through the air cooled condenser 70. If the valve 4 is open, compressed and condensed liquid refrigerant passing from the condenser 70 then passes through lines 66 and 68, the open valve 4 and external line 89 to the third port 109 on the storage tank 110. If the valve 4 is closed, the compressed and condensed liquid refrigerant passing from the condenser 70 then passes through lines 66 and 72, through the expansion coil 74, wherein the compressed liquid is expanded to a lower pressure and further cooled by the expansion. From the expansion coil 74, the refrigerant ,which now may be a mixture of liquid and vapor, passes the portion of line 68 downstream of the branch connection 75 to and through the external line 89 to the third port 109 on the storage tank 110. As the valve 114 is open and the valve 116 is closed, the liquid refrigerant entering through the third port 109 passes through line 117 directly into the storage tank 110.

Figure 5:
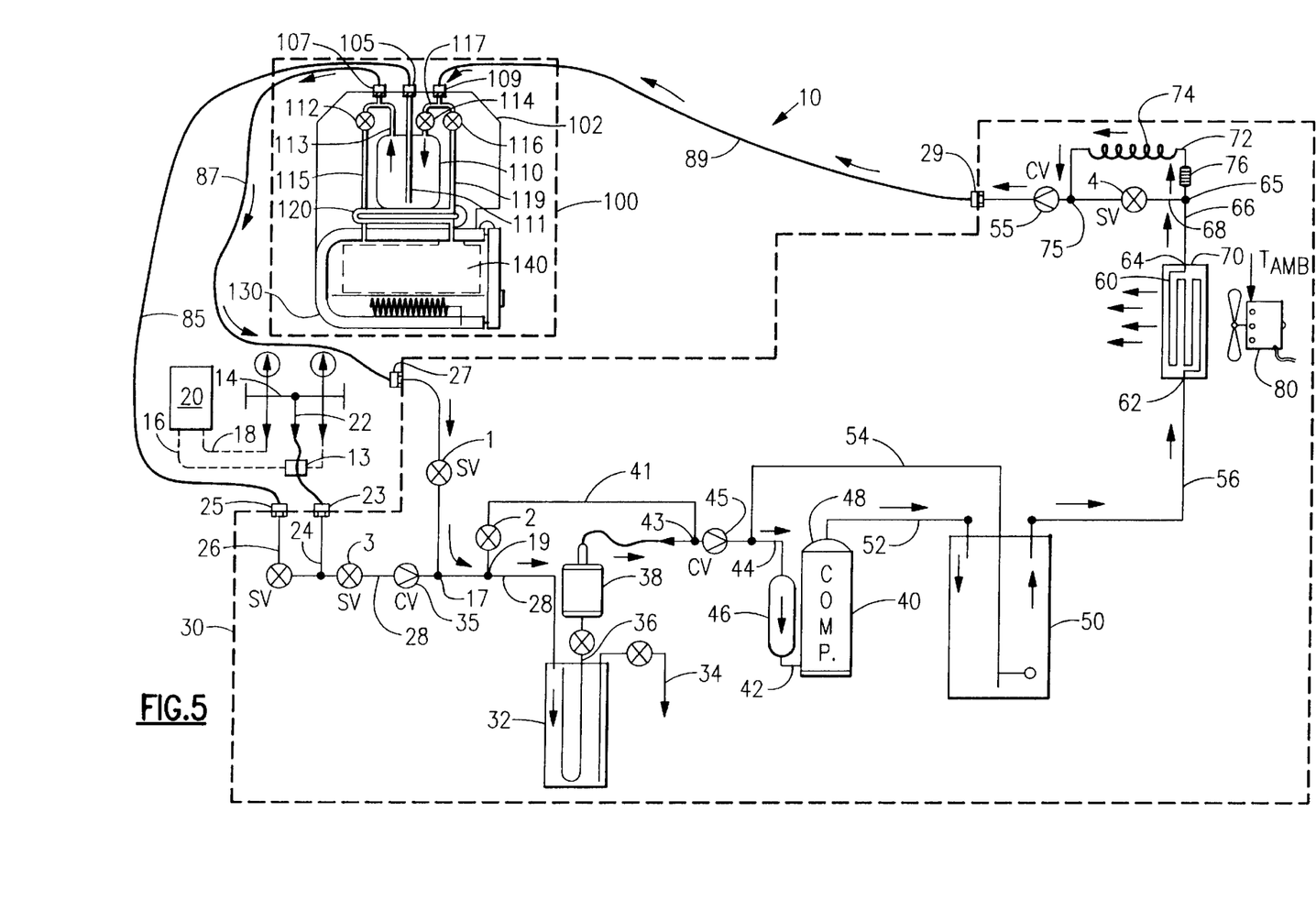
FIG. 5 is a diagrammatical representation of a refrigerant recovery system of FIG. 1 operating in the storage tank cooling mode.

In the event that the storage tank 110 becomes too warm, the recovery system 10 may be operated in the storage tank cooling mode, as illustrated in FIG. 5. On the refrigerant recovery apparatus 30, the selectively positionable valves 2, 3, 4 and 5 are positioned closed and the selectively positionable valve 1 is positioned open. On the refrigerant disposal apparatus 100, the selectively positionable valve 114 is positioned open and the selectively positionable valves 112 and 116 are positioned closed, as in the liquid recovery mode. Vaporous refrigerant is withdrawn from the top of the storage tank 110 via the second port 107 through line 87 and into the recovery apparatus 30 through line 37 and open valve 1. Therein, the refrigerant vapor passes through line 28 to and through the accumulator/oil trap 32, through the filter dryer 38, through line 44 and the accumulator 46, to suction port 42 and into the compressor 40. Compressed refrigerant exiting from the compressor 40 passes through line 52, the oil separator 50. line 56 to and through the air cooled condenser 70. With the valve 4 is closed, the compressed and condensed liquid refrigerant passing from the condenser 70 then passes through lines 66 and 72, through the expansion coil 74, wherein the compressed liquid is expanded to a lower pressure and further cooled by the expansion. From the expansion coil 74, the refrigerant, which now may be a mixture of liquid and vapor, passes through the portion of line 68 downstream of the branch connection 75 to and through the external line 89 to the third port 109 on the storage tank 110. As the valve 114 is open and the valve 116 is closed, the liquid refrigerant entering through the third port 109 passes through line 117 directly into the storage tank 110.

The storage tank 110 is preferably sized to hold the amount of refrigerant that may be effectively destroyed by the reactor core 135 in the reactor 130 without replacement of the reactor core. When the storage tank 110 is filled, the refrigerant recovery system is operated in the refrigerant destruction mode which will be described with reference to FIG. 6 in particular. To operate the refrigerant recovery system 10 in the refrigerant destruction mode, the refrigerant recovery apparatus 30 is switched from the recovery modes, such as hereinbefore described, to a recycle mode and the disposal apparatus 100 is switched from the refrigerant collection mode, such as hereinbefore described, to the refrigerant disposal mode. On the refrigerant recovery apparatus 30, the selectively positionable valves 2, 3 and 5 are positioned closed and the selectively positionable valves 1 and 4 are positioned open. On the refrigerant disposal apparatus 100, the selectively positionable valve 114 is positioned closed and the selectively positionable valves 112 and 116 are positioned opened.

Figure 6:
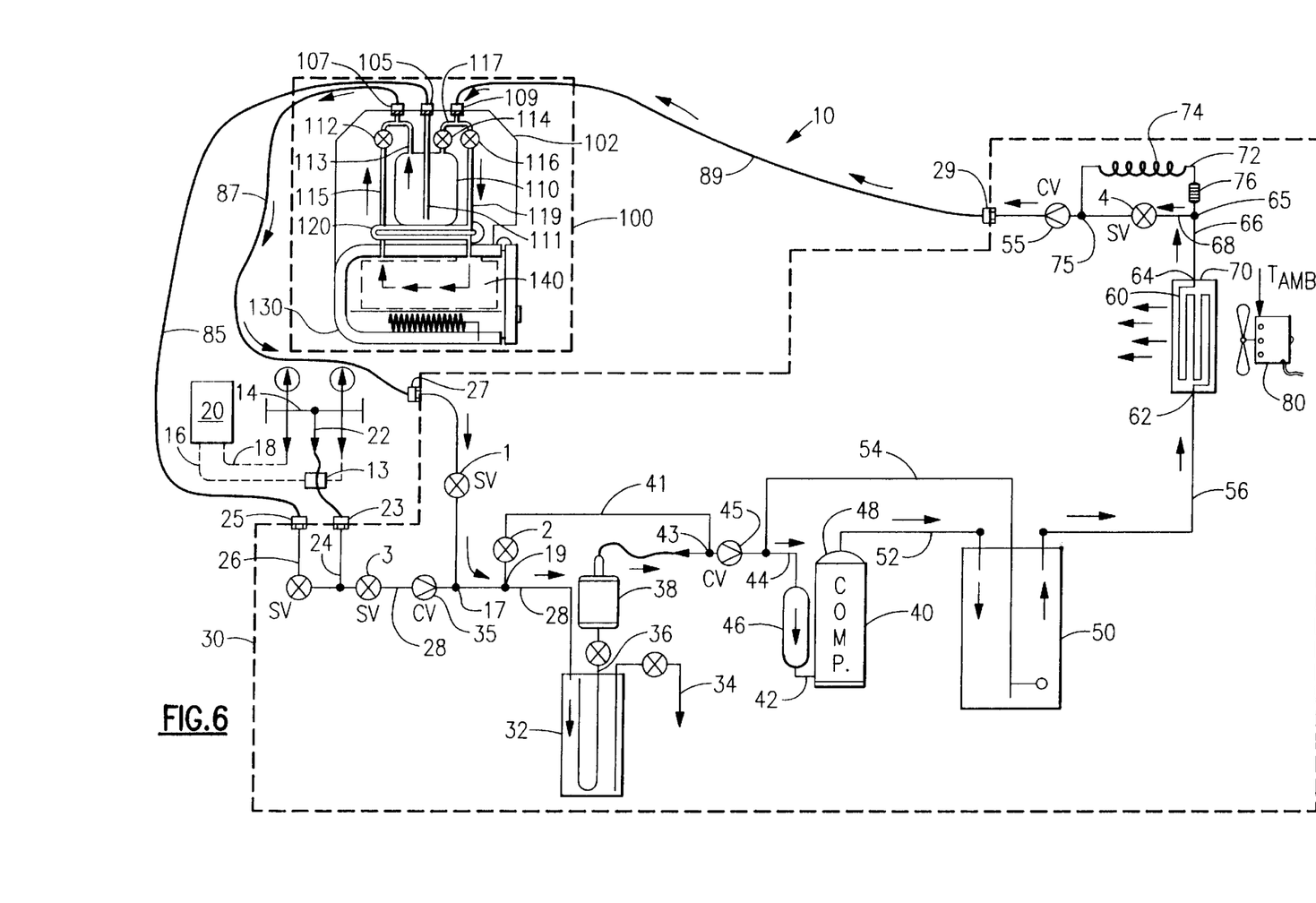
FIG. 6 is a diagrammatical representation of a refrigerant recovery system of FIG. 1 operating in the refrigeration destruction mode.

In the refrigerant destruction mode, the heater 138 is activated to heat and maintain the reaction chamber 135 and reactor 140 at a desired reaction temperature. To initiate operation in this mode, vaporous refrigerant is withdrawn from the top of the storage tank 1 10 via the second port 107 through line 87 and into the recovery apparatus 30 through line 37 and open valve 1. Therein, the refrigerant vapor passes through line 28 to and through the accumulator/oil trap 32, through the filter dryer 38, through line 44 and the accumulator 46, to suction port 42 and into the compressor 40. Compressed refrigerant exiting from the compressor 40 passes through line 52, the oil separator 50. line 56 to and through the air cooled condenser 70. With the valve 4 open, compressed and condensed liquid refrigerant passing from the condenser 70 then passes through lines 66 and 68, the open valve 4 and external line 89 to the third port 109 on the storage tank 110. As the valve 114 is now closed and the valve 116 is now open, the refrigerant entering through the third port 109 passes through conduit 119 and the heat exchanger 120 directly into the reaction chamber 135 of the reactor 130 wherein the refrigerant reacts with an appropriate reactant for converting the halogenated hydrocarbon molecules in the refrigerant into halides and gaseous products as hereinbefore described.

The gaseous reaction products produced during reaction of the refrigerant with the reagent in the reactor core, together with entrained unreacted refrigerant, are drawn out of the reaction chamber 135 through conduit 115 and the open valve 112 and out the first port 107 and through the external refrigerant line 87 to be recycled through the recovery apparatus which continues to operate in the circulation mode. These gases mix with refrigerant being drawn from the tank 110 through conduit 113 to the first port 107 and thence through the external refrigerant line 87. The gaseous reaction products passing through the conduit 115 pass through the heat exchanger 120 where the gases are cooled. The heat absorbed from the gas in the heat exchanger 120 is transferred to the fluid passing through conduit 119 and into the reaction chamber 135. Thus, the heat exchanger 120 functions to not only preheat and perhaps at least partially vaporize the fluid passing to the reaction chamber 135, but also to cool the hot reaction product gases exiting the reactor to a temperature that is acceptable to the recovery apparatus 130.

The circulation cycle is continuously conducted as needed for one or more passes of the fluid through the recovery system 10 operating in the refrigerant destruction mode as hereinbefore described until all of the refrigerant is destroyed. Thereafter, the valves 112 and 116 on the disposal apparatus 100 are closed, the heater 138 is deactivated. Once the reaction chamber has sufficiently cooled, the access door 134 may be opened and the spent reactor core removed, a fresh reactor inserted and the access door closed. The disposal apparatus 100 is now ready to process another batch of refrigerant when the tank 110 is again full.

Figure 7:
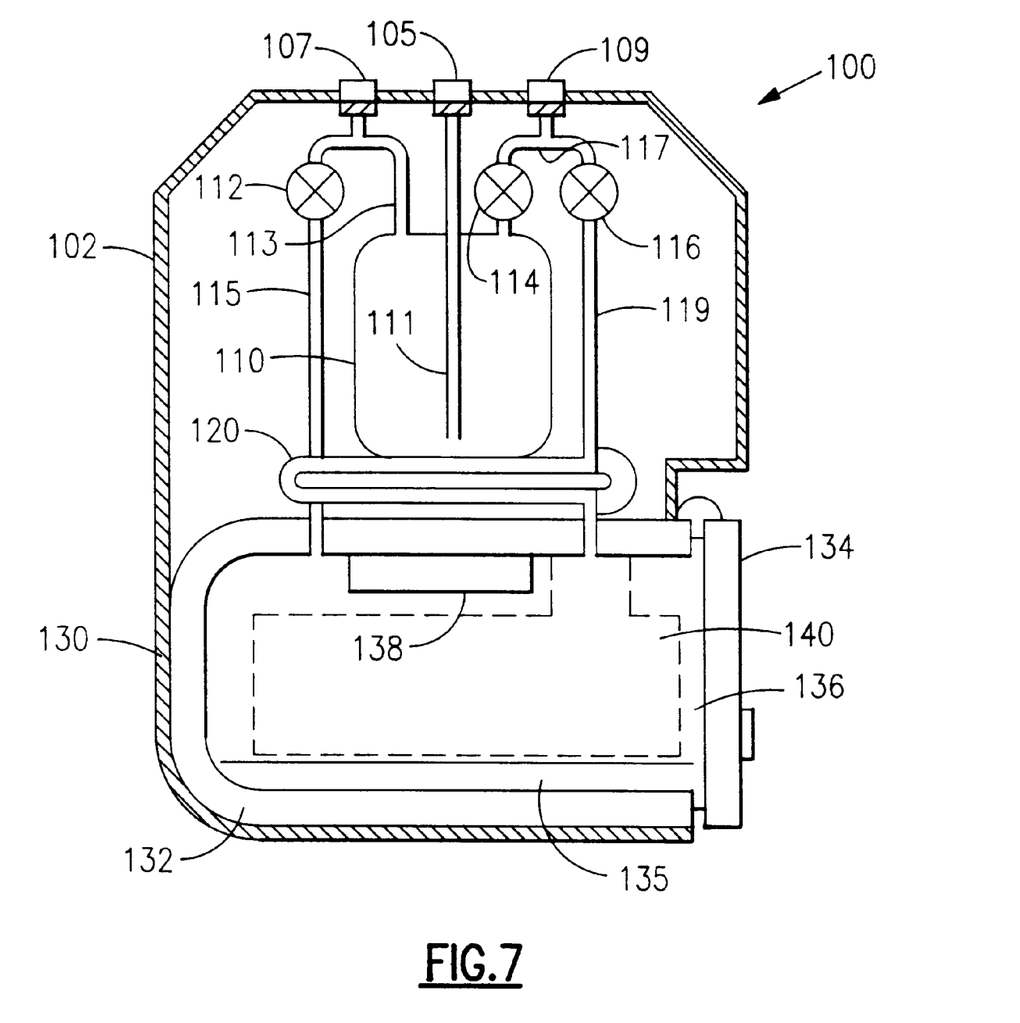
FIG. 7 is an enlarged diagrammatical representation of another embodiment of the refrigerant disposal apparatus of the present invention.

Referring now to FIG. 7, this is depicted in another embodiment of the refrigeration disposal apparatus 100 wherein the heater 138 comprises a microwave heater operatively associated within the reaction chamber 135 and operative to heat the reactor core 140 via microwave radiation. If the material making up the reactor core 140 does not have the appropriate microwave resistivity for it to be effectively heated via microwave radiation, a material of suitable microwave resistivity, such as for example carbon particles, preferably activated carbon powder, and silicon carbide powder or fibers, may be dispersed throughout the reactor core 140 to improve the effectiveness of the heating of the reactor core 140 by microwave radiation. In addition to the 2.54 GHz wavelength microwave radiation used in conventional commercially available microwave generators, other wavelengths of microwave radiation may also be employed. Microwave radiation may also be used in conjunction with reactor cores containing reagents that destroy halogenated hydrocarbon compounds by either oxidative reactions, reductive reactions, or hydrolysis based-reactions as hereinbefore described.

When a microwave heater is used, the reactor core 140 may be heated more quickly and to higher bed temperatures, particularly in the central region of the core, than achievable with heaters that depend upon convective heating, such as electrical resistance heaters and flame heaters. With electrical resistance heaters, burners and other conventional heaters that heat via convection and/or thermal radiation, rapid heating of the reactor core 140 is difficult as not only the reactor core, but also the walls of the reactor defining the reaction chamber 135 are heated. With microwave radiation and an appropriate core material, only the reactor core itself is heated. Further, due to the nature of microwave radiation, the central portion of the reactor core 140 is directly heated rather than being heated indirectly through conduction from the surface of the reactor core as when convective heating is employed.

For example, a reactor core comprising a packed bed of sodium oxalate was placed in 0.9 ft$^3$ microwave chamber and subjected to microwave radiation at 2.54 GHz wavelength from a quartz tube emitter. A thermocouple encased in quartz was placed in the bed with its metal tip in direct contact with the center of the packed bed. After 1 minute of irradiation at a power level of 800 W, the thermocouple registered over 180° C. Although exposed to a recirculating flow of R12 refrigerant at a rate flow of approximately 6 milliliters per minute at a pressure of 5 psig, the center of the packed bed was maintained at temperature ranging from about 100° C. to about 190° C. over a irradiation time of 1½ hours.

Higher bed temperatures are attainable by dispersing a material having a relatively high microwave resistivity throughout the reactor core. For example, 0.7 grams of carbon powder was dispersed throughout a packed bed of 3.1 grams of sodium oxalate and exposed to microwave radiation in the aforementioned microwave chamber at a level of 800 W. The temperature of the central portion of packed bed reached over 830° C. in just 14 seconds. When only a trace of carbon powder was dispersed throughout a packed bed of 5.1 grams of sodium oxalate and similarly exposed to microwave radiation at a power level of 800 W, the temperature of the central portion of the bed reached about 580° C. in 11 seconds.

Further, other materials, for example silicone carbon powder or fibers, may be used mixed into the reactor core bed to improve the response of the bed to microwave radiation. For example, 0.0296 grams of SiC powder was dispersed throughout a packed bed of sodium oxalate. When exposed to microwave irradiation as in the previous examples at a power level of 800 W, bed temperatures of over 400° C. were achieved in 23 seconds.

Due to the fact that through microwave heating relatively higher bed temperatures, for example 1000° C., may be attainable in the reactor core 140, the microwave heater 138 may be cycled on and off, thereby reducing power consumption. Also, as higher kinetic reaction rates are attainable in the bed as a result of the higher bed temperatures, the time required for complete destruction of the refrigerant, as well as power consumption, is reduced.

If the reactions that occur within the reactor core 140 during the destruction of the refrigerant are sufficiently exothermic, the heating device 138 may be eliminated if the heat of reaction generated is sufficient to raise and maintain the reactor core at the desired reaction temperature, is or downsized. Whether an electric resistance heater, a flame heater, a microwave, or a other heating means is employed, the refrigerant disposal apparatus 100 provides a means for breaking a halogenated hydrocarbon refrigerant down in situ into more environmentally compatible components. The refrigerant disposal apparatus 100 may be housed in a portable structure which is transportable from site to site. The refrigerant disposal apparatus 100 may be connected to any conventional refrigerant recovery equipped with a collection tank and operable in a recycle mode. Conventional refrigerant recovery systems may be converted for in situ refrigerant disposal by removing the standard refrigerant collection tank and connecting the refrigerant disposal apparatus 100 using the same connections provided for the former collection tank. The disposal apparatus 100 may also be operated independently from the recovery apparatus 30 and used as a portable device with an independent portable pumping system to circulate refrigerant through the reactor core 140.

What is claimed is:

1. A system for the on-site destruction of compressible refrigerant from a refrigerant containing system, comprising;

a refrigeration recovery apparatus for receiving refrigerant from the refrigerant containing apparatus either as liquid refrigerant or as gaseous refrigerant, said recovery apparatus having a first flow path passing liquid refrigerant received from the refrigerant containing apparatus to a first outlet port and a second flow path for passing gaseous refrigerant received from the refrigerant containing apparatus to a second outlet port, said recovery apparatus including a compressor device for compressing gaseous refrigerant delivered thereto and a condenser device for withdrawing heat from and at least partially condensing compressed refrigerant passing therethrough, said condenser device having an inlet for receiving compressed refrigerant from said compressor device and an outlet for discharging cooled and at least partially condensed refrigerant upstream of the second outlet of said recovery apparatus; and a portable refrigerant disposal apparatus for destroying at the site of recovery refrigerant received from said recovery apparatus, said disposal apparatus including a storage tank for collecting refrigerant received from the first outlet port and from the second outlet port of said recovery apparatus, and a reactor device for receiving refrigerant collected in said storage tank and destroying the refrigerant received from the storage tank.

2. A system as recited in claim 1 wherein said reactor device comprises:

a housing having an access door and defining a reaction chamber therewithin;

a replaceable reactor core disposed within the reaction chamber, said reactor core containing a reagent functional to chemically react with the received refrigerant; and a heater device operatively associated with the reaction chamber for heating the reactor core to a desired temperature.

3. A system as recited in claim 2 wherein the refrigerant comprises a halogenated hydrocarbon having halogen radicals and the reagent contained in said reactor core comprises a reagent effective in reducing the halogen radicals in the halogenated hydrocarbons to halides.

4. A system as recited in claim 2 wherein the reagent contained in said reactor core is selected from the group comprising sodium oxalate, sodium carbonate, sodium iodide, activated carbon, ammonia and amines.

5. A system as recited in claim 2 wherein the refrigerant comprises an electron donor that can provide for halogen.

6. A system as recited in claim 1 further comprising a heat exchanger operatively associated with said reactor for heating the refrigerant passing from said storage tank to said reactor.

7. A system as recited in claim 6 wherein the heat exchanger operatively associated with said reactor for heating the refrigerant passing from said storage tank to said reactor also cools reactant products passing from said reactor.

8. A portable refrigerant disposal apparatus for destroying at the site of recovery refrigerant recovered from a refrigerant containing apparatus, said disposal apparatus including a storage tank for collecting the received refrigerant and a reactor device for receiving refrigerant collected in said storage tank and destroying the refrigerant received from the storage tank.

9. An apparatus as recited in claim 8 wherein said reactor device comprises:

a housing having an access door and defining a reaction chamber therewithin;

a replaceable reactor core disposed within the reaction chamber, said reactor core containing a reagent functional to chemically react with the received refrigerant; and a heater device operatively associated with the reaction chamber for heating the reactor core to a desired temperature.

10. An apparatus as recited in claim 9 wherein a heat exchanger is operatively associated with said reactor for heating the refrigerant passing from said storage tank to said reactor and for cooling the reactant products passing from said reactor.

11. An apparatus as recited in claim 8 wherein the refrigerant comprises a halogenated hydrocarbon having halogen radicals and the reagent contained in said reactor core comprises a reagent effective in reducing the halogen radicals in the halogenated hydrocarbons to halides.

12. An apparatus as recited in claim 8 wherein the reagent contained in said reactor core is selected from the group comprising sodium oxalate, sodium carbonate, sodium iodide, activated carbon, ammonia and amines.

13. An apparatus as recited in claim 8 wherein the refrigerant comprises an electron donor that can provide for halogen.

14. A portable refrigerant disposal apparatus for destroying at the site of recovery refrigerant recovered from a refrigerant containing apparatus, said disposal apparatus comprising:

a storage tank for collecting the received refrigerant and a reactor device for receiving refrigerant collected in said storage tank and destroying the refrigerant received from the storage tank, the reactor device including a reaction chamber defined within a housing having an access door;

a flow circuit defining a fluid passageway between said storage tank and said reaction tank through which the received refrigerant may be selectively passed to said reaction chamber;

a replaceable reactor core disposed within the reaction chamber, said reactor core containing a reagent functional to chemically react with the received refrigerant; and a heater device operatively associated with the reaction chamber for heating the reaction core to a desired temperature.

15. An apparatus as recited in claim 14 further comprising a heat exchanger operatively associated with said reactor for heating the refrigerant passing from said storage tank to said reactor and for cooling the reactant products passing from said reactor.

16. An apparatus as recited in claim 14 wherein the refrigerant comprises a halogenated hydrocarbon having halogen radicals and the reagent contained in said reactor core comprises a reagent effective in reducing the halogen radicals in the halogenated hydrocarbons to halides.

17. An apparatus as recited in claim 14 wherein the reagent contained in said reactor core is selected from the group comprising sodium oxalate, sodium carbonate, sodium iodide, activated carbon, ammonia and amines.

18. An apparatus as recited in claim 14 wherein the refrigerant comprises an electron donor that can provide for halogen.

19. A portable refrigerant disposal apparatus for destroying at the site of recovery refrigerant recovered from a refrigerant containing apparatus, said disposal apparatus comprising:

a storage tank for collecting the received refrigerant and a reactor device for receiving refrigerant collected in said storage tank and destroying the refrigerant received from the storage tank, the reactor device including a reaction chamber defined within a housing having an access door;

a flow circuit defining a fluid passageway between said storage tank and said reaction tank through which the received refrigerant may be selectively passed to said reaction chamber;

a heat exchanger operatively disposed in said flow circuit for heating the refrigerant passing from said storage tank to said reactor and for cooling the reactant products passing from said reactor;

a replaceable reactor core disposed within the reaction chamber, said reactor core containing a reagent functional to chemically react with the received refrigerant; and a microwave heater operatively associated with the reaction chamber for heating the reaction core to a desired temperature.

20. An apparatus as recited in claim 19 wherein said reactor core further comprises a material having a relatively high microwave resistivity admixed with said reagent.

* * * * *